United States Patent [19]

Matsubayashi et al.

[11] Patent Number: 4,627,520
[45] Date of Patent: Dec. 9, 1986

[54] FRONT BRAKE APPARATUS IN MOTORIZED THREE-WHEELED VEHICLE

[75] Inventors: Shinji Matsubayashi, Tokyo; Satoru Kiyota, Yokohama; Eiji Hosoya, Asaka, all of Japan

[73] Assignee: Honda Giken Kogyo Kabushiki Kaisha, Tokyo, Japan

[21] Appl. No.: 774,187

[22] Filed: Sep. 9, 1985

Related U.S. Application Data

[63] Continuation of Ser. No. 550,146, Nov. 9, 1983, abandoned.

[30] Foreign Application Priority Data

Nov. 11, 1982 [JP] Japan ............. 57-169824[U]

[51] Int. Cl.$^4$ ................................. B60T 1/06
[52] U.S. Cl. .................... 188/18 R; 180/215; 188/218 A; 277/152; 277/153; 277/166; 277/189
[58] Field of Search ............ 188/218 A, 18 R, 26; 192/113 A; 301/6 WB, 6 W, 6 S; 180/210, 215, 217; 277/152, 153, 166, 189

[56] References Cited

U.S. PATENT DOCUMENTS

| | | | |
|---|---|---|---|
| 1,878,855 | 9/1932 | Johnston | 188/218 A |
| 1,911,593 | 5/1933 | Swain | 188/218 A |
| 2,259,813 | 10/1941 | Garnett et al. | 188/18 R X |
| 2,263,079 | 11/1941 | Flynn | 188/218 A |
| 2,275,025 | 3/1942 | Ash | 188/18 R |
| 2,747,902 | 5/1956 | Payne et al. | 188/218 A X |
| 2,762,458 | 9/1956 | Goepfrich et al. | 188/218 A X |
| 4,455,032 | 6/1984 | Kajikawa | 267/8 R X |

Primary Examiner—Douglas C. Butler
Assistant Examiner—Michael P. Gilday
Attorney, Agent, or Firm—Armstrong, Nikaido, Marmelstein & Kubovcik

[57] ABSTRACT

A front brake apparatus in a motorized three-wheeled vehicle of the type that a wheel hub supported rotatably on a front wheel axle is provided with a brake drum fixed thereto. A brake panel fixed to the front wheel axle is so provided as to be positioned axially outside the brake drum. The brake panel is provided with brake shoes arranged to be brought into internal contact with the brake drum. The invention is characterized in that the brake panel is provided with a drum cover which extends to cover a surrounding portion of the brake drum and serves to tightly seal the surrounding portion through a seal member. The seal member is positioned in an inside space defined by a wheel rim attached to the wheel hub.

3 Claims, 5 Drawing Figures

FRONT BRAKE APPARATUS IN MOTORIZED THREE-WHEELED VEHICLE

This application is a continuation of application Ser. No. 550,146, filed Nov. 9, 1983, now abandoned.

BACKGROUND OF THE INVENTION

This invention relates to a front brake apparatus in a motorized three-wheeled vehicle.

It has been usual that a three-wheeled vehicle is not provided with any means for tightly sealing a front brake apparatus thereof. Consequently the brake apparatus can be coated or clogged with muddy water, dust or the like.

OBJECT AND SUMMARY OF THE INVENTION

This invention has for its object to provide an apparatus of this kind free from this inconvenience.

An apparatus of the type wherein a wheel hub supported rotatably on a front wheel axle is provided with a brake drum fixed thereto, a brake panel fixed to the front wheel axle is positioned axially outside the brake drum, and the brake panel is provided with brake shoes arranged to be brought into internal contact with the brake drum, characterized in that the brake panel is provided with a drum cover which extends to cover a surrounding portion of the brake drum and serves to tightly seal the surrounding portion through a seal member.

BRIEF DESCRIPTION OF THE DRAWINGS

The above and other objects and the attendant advantages of the present invention will become readily apparent by refence to the following detailed description when considered in conjunction with the accompanying drawings wherein.

DETAILED DESCRIPTION OF PREFERRED EMBODIMENTS

Figure 1:
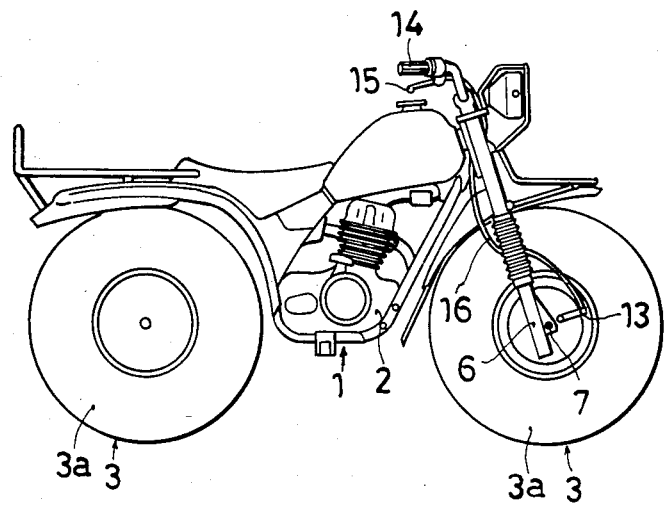
FIG. 1 is a side view of a motorized three-wheeled vehicle having one embodiment of the present invention.
Figure 2:
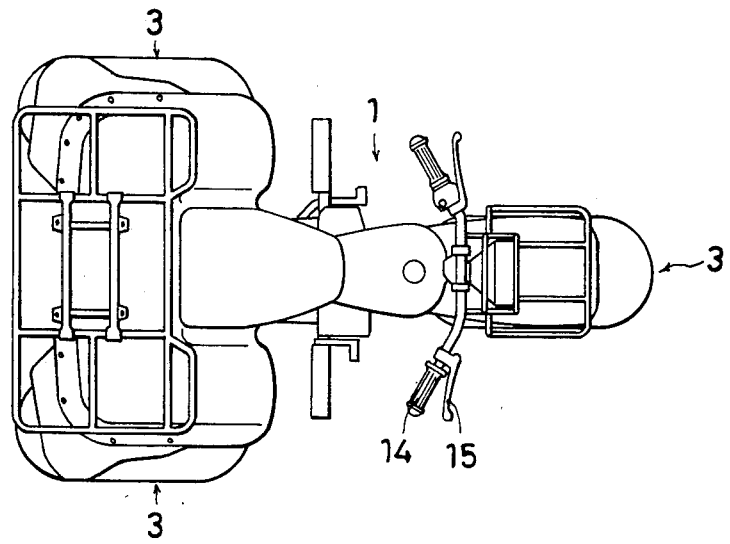
FIG. 2 is a top plan view thereof.

One embodying example of this invention will now be explained with reference to the accompanying drawings:

Referring to the drawings, as shown in FIGS. 1 and 2, a vehicle body 1 is provided at its middle portion with an internal combustion engine 2 mounted thereon and is additionally provided with a single front wheel 3 with a balloon tire 3a and two rear wheels 3, 3 with respective balloon tires 3a, 3a. This is the basic structure of a motorized three-wheeled vehicle suitable for off-road driving.

Figure 3:
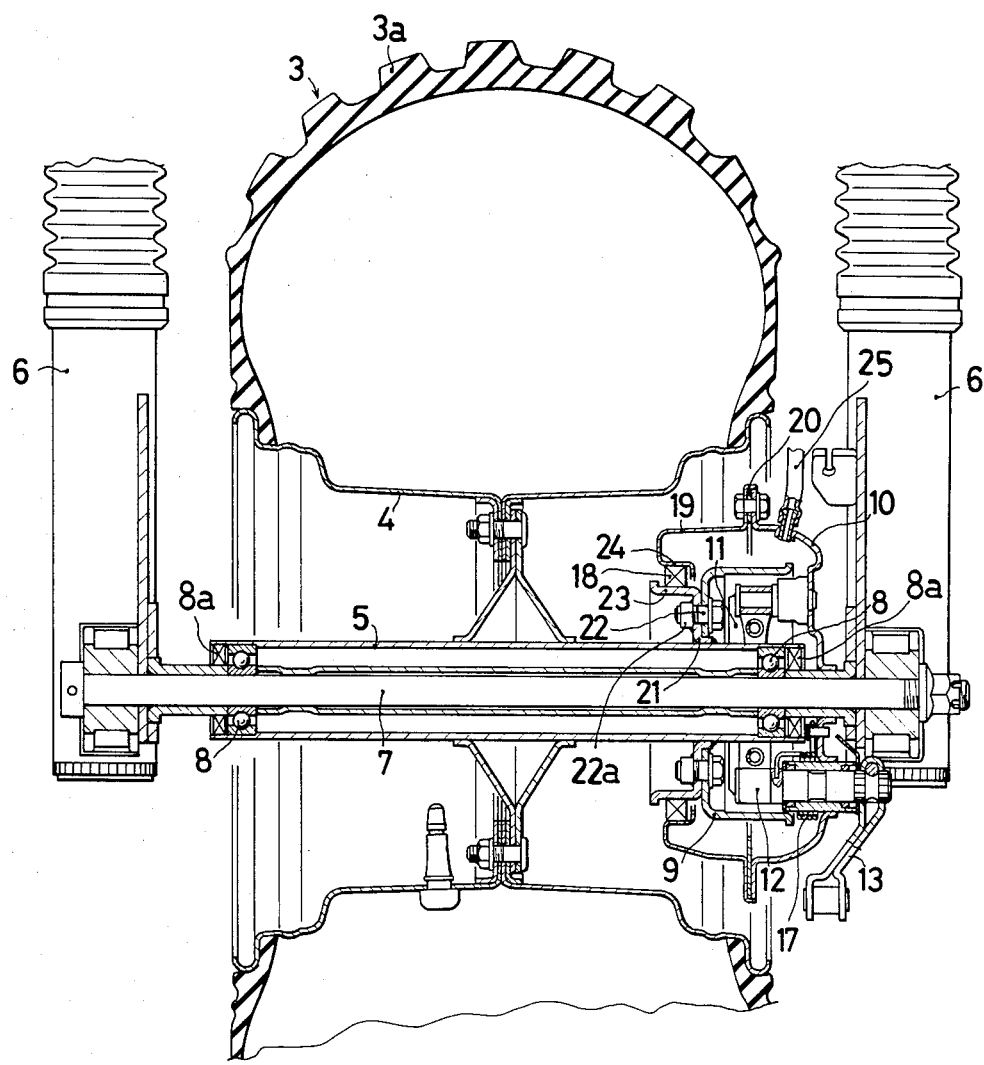
FIG. 3 is an enlarged sectional view of an important portion thereof.

As shown clearly in FIG. 3, the front wheel 3 is provided with an inner circumferential wheel hub 5 and an outer circumferential wheel rim 4 attached thereto. The front wheel 3 is rotatably supported, at its wheel hub 5, on a front wheel axle 7 laterally extending between a pair of right and left front forks 6, 6 of the vehicle body 1, through a pair of right and left bearings 8, 8 on both ends of the wheel axle 7. A brake drum 9 is fixed to an outer surface of one end portion of the wheel hub 5. A pair of seal members 8a, 8a are provided on both ends outside of the bearings 8, 8.

A brake panel 10 fixed to the wheel axle 7 is positioned outside the brake drum 9. Brake shoes 11 arranged to be brought into internal contact with the brake drum 9 and a brake cam 12 serving to expand the brake shoes 11 are provided on the brake panel 10. A brake arm 13 attached to a shaft portion of the brake cam 12 and a brake lever 15 provided on a steering handle 14 are interconnected through a brake cable 16, so that when the lever 15 is operated, the cam 17 is turned against the action of a return spring 17 through the cable 16 and the arm 13 and thereby the shoes 11 may be expanded to obtain a braking operation.

The above construction is not especially different from that of a conventional apparatus. According to this invention, the brake panel 10 is provided with a drum cover 19 which extends to cover a surrounding portion of the brake drum 9 and serves to seal the same portion tightly through a seal member 18. More in detail, in the illustrated example, the cover 19 is formed as a tubular shape surrounding the drum 9, and has a flange portion formed at an outer end thereof. The flange portion is put on and connected, through a packing 20, to a flange portion formed on an outer periphery of the panel 10. The drum 9 is put on and fixed, by bolts 22 and nuts 22a, to an outward surface of a drum setting plate 21 fixed, by welding or the like, to the wheel hub 5. An outer circumferential edge portion of the plate 21 is bent inwards in the axial direction thereof to form a drum side seal receiving member 23. An inward end portion of the cover 19 is bent into a nearly U-shaped cross-section to form a cover side seal receiving member 24 facing the foregoing seal receiving member 23. The seal member 18 is interposed between the two seal receiving members 23, 24.

The seal member 18 is preferably positioned in an inside space defined by the wheel rim 4, so that muddy water, dust or the like can be prevented from adhering directly to the seal member 18. Consequently reliable sealing thereof can be ensured.

In order that the return spring 17 of the brake cam 12 may be also prevented from rusting and be improved in durability, it is also desirable to keep the muddy water or dust off of it. For this purpose, in the illustrated example, the spring 17 is positioned in a space which is formed inside the brake panel 10 and is tightly sealed by the cover 19.

Referring to the drawings, a breather pipe 25 is so provided as to be directed toward the outer wall of the brake drum 9.

Figure 4:
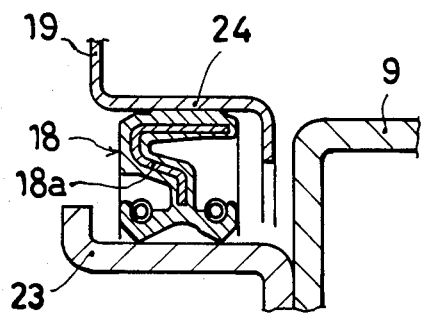
FIG. 4 is an enlarged sectional view of a seal member portion thereof.
Figure 5:
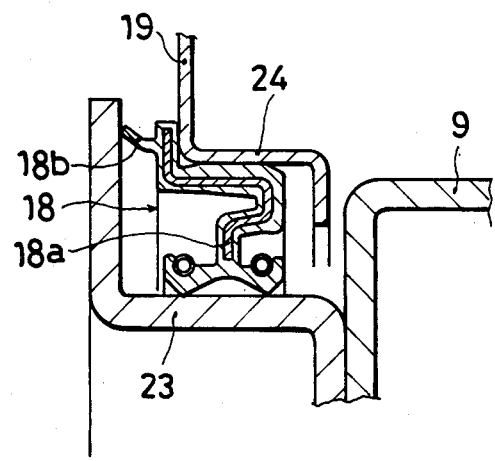
FIG. 5 is an enlarged sectional view of a modified example thereof.

The foregoing seal member 18 is preferably constructed having as shown in FIG. 4, a support plate 18a bent into a channel form to take up thermal deformation of the drum side seal receiving member 23 in a radial direction caused by heat transmission from the brake drum 9. Additionally, the member 18 may have, as shown in FIG. 5, a lip 18b for dust sealing on the outer circumferential portion thereof.

Thus, according to this invention, the brake panel of the front brake apparatus is provided with the drum cover which extends to cover a surrounding portion of the brake drum and serves to tightly seal that portion through a seal member, so that the drum and the brake shoes arranged to be brought into internal contact therewith can be kept clean and reliable braking can be obtained.

It is readily apparent that the above-described front brake apparatus for a three-wheeled vehicle meets all of the objects mentioned above and also has the advantage of wide commercial utility. It should be understood that the specific form of the invention herinabove described is intended to be representative only, as certain modifications within the scope of these teachings will be apparent to those skilled in the art.

Accordingly, reference should be made to the following claims in determining the full scope of the invention.

What is claimed is:

1. A front brake and wheel supporting apparatus for a front wheel of a three wheeled vehicle said wheel including a rim, said vehicle having a pair of front forks, said apparatus comprising:
   an axle fixedly provided between the pair of front forks,
   a pair of bearings, each mounted on said axle near one of said front forks,
   a wheel hub rotatably mounted on and extending between said pair of bearings, the wheel being attached to said wheel hub,
   a drum setting plate fixed to and extending radially from said wheel hub, said drum setting plate being positioned axially inwardly of a circumferential edge of the rim of the wheel and having an axially outwardly facing surface and an outer circumference,
   a brake drum bolted to said outwardly facing surface,
   a brake panel fixed to said wheel axle and positioned substantially axially outwardly of said brake drum and substantially axially outwardly of the circumferential edge of the rim, said panel having a radially outer circumferential portion extending axially inwardly to a position which is axially inwardly of the circumferential edge of the rim,
   brake shoes provided on said brake panel arranged to be brought into internal contact with said brake drum,
   a drum cover attached to said radially outer circumferential portion of said brake panel and extending to cover a surrounding portion of said brake drum,
   a drum side seal receiving member integrally formed along said outer circumference of said drum setting plate and extending axially inwardly thereof substantially in parallel to and separate from said wheel hub,
   a cover side seal receiving member facing said drum side seal receiving member and being formed of a nearly U-shaped cross-sectional bent end portion of said drum cover, and
   a seal member interposed between said drum side seal receiving member and said cover side seal receiving member, said seal member comprising: an outer member, and an inner support plate encased in said outer member and being bent into a channel form having a curved portion of U-shape in section opening in an axial direction to take up deformation of said drum side seal receiving member in a radial direction.

2. The apparatus as claimed in claim 1, wherein said seal member further comprises a lip for dust sealing said lip being disposed on a radially outer circumferential portion of said seal member contacting a radially extending portion of said drum side seal receiving member.

3. The apparatus as claimed in claim 1, wherein said brake drum is bolted to said outwardly facing surface of said drum setting plate by a plurality of bolts and nuts, each bolt having a headed end facing axially outwardly and a threaded end extending axially inwardly, each nut being threadingly engaged with one of said threaded ends at an axially inner surface of said drum setting plate, said drum side seal receiving member extending axially inwardly beyond said threaded ends and said nuts.

* * * * *